US012686765B2

(12) United States Patent
Macy et al.

(10) Patent No.: US 12,686,765 B2
(45) Date of Patent: Jul. 21, 2026

(54) MULTILAYER STRUCTURE WITH A HIGH IMPACT RESISTANCE, HIGH MELT FLOW, LOW WATER HAZE CAP LAYER

(71) Applicant: Trinseo Europe GmbH, Pfaeffikon (CH)

(72) Inventors: Noah E. Macy, Royersford, PA (US); Jing-Han Wang, Blue Bell, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 382 days.

(21) Appl. No.: 18/028,277

(22) PCT Filed: Sep. 23, 2021

(86) PCT No.: PCT/US2021/051644
§ 371 (c)(1),
(2) Date: Mar. 24, 2023

(87) PCT Pub. No.: WO2022/066833
PCT Pub. Date: Mar. 31, 2022

(65) Prior Publication Data
US 2024/0002651 A1 Jan. 4, 2024

Related U.S. Application Data

(60) Provisional application No. 63/083,281, filed on Sep. 25, 2020.

(51) Int. Cl.
| | |
|---|---|
| *C08L 33/12* | (2006.01) |
| *B32B 7/02* | (2019.01) |
| *B32B 27/08* | (2006.01) |
| *B32B 27/18* | (2006.01) |
| *B32B 27/30* | (2006.01) |
| *C08F 265/06* | (2006.01) |

(52) U.S. Cl.
CPC .............. *C08L 33/12* (2013.01); *B32B 7/02* (2013.01); *B32B 27/08* (2013.01); *B32B 27/18* (2013.01); *B32B 27/304* (2013.01); *B32B 27/308* (2013.01); *C08F 265/06* (2013.01); *B32B 2307/4026* (2013.01); *B32B 2307/414* (2013.01); *B32B 2307/558* (2013.01); *B32B 2307/7376* (2023.05); *C08L 2205/025* (2013.01); *C08L 2207/53* (2013.01)

(58) Field of Classification Search
CPC .............. C08L 33/12; C08L 2205/025; C08L 2207/53; C08L 51/003; C08L 2205/02;

C08L 2205/03; B32B 7/02; B32B 27/08; B32B 27/18; B32B 27/304; B32B 27/308; B32B 2307/4026; B32B 2307/414; B32B 2307/558; B32B 2307/7376; B32B 2307/732; B32B 27/302; B32B 27/36; B32B 27/365; B32B 27/40; C08F 265/06; C08F 220/40; C08F 285/00
See application file for complete search history.

(56) References Cited

U.S. PATENT DOCUMENTS

| | | | |
|---|---|---|---|
| 7,195,820 B2 | 3/2007 | Hong et al. | |
| 2003/0216510 A1 | 11/2003 | Wanat et al. | |
| 2012/0164364 A1* | 6/2012 | Mehlmann | C08F 265/06 |
| | | | 525/190 |
| 2015/0299454 A1* | 10/2015 | Barsotti | C08J 3/005 |
| | | | 525/64 |

FOREIGN PATENT DOCUMENTS

| | | |
|---|---|---|
| EP | 0476942 A2 | 3/1992 |
| WO | 2007008304 A1 | 1/2007 |
| WO | 2011062781 A1 | 5/2011 |
| WO | 2020198179 A1 | 10/2020 |

OTHER PUBLICATIONS

International Preliminary Report on Patentability and Written Opinion for International Application No. PCT/US2021/051644, dated Mar. 28, 2023, 8 pages.
International Search Report and Written Opinion for International Application No. PCT/US2021/051644, dated Jan. 3, 2022, 10 pages.

* cited by examiner

*Primary Examiner* — Michael C Miggins
(74) *Attorney, Agent, or Firm* — BUCHANAN INGERSOLL & ROONEY PC

(57) ABSTRACT

Polymeric resin compositions, and preferably acrylic or styrenic polymeric compositions, which are especially useful as a capstock material for coextrusion over, or lamination onto structural plastics. The polymeric capstock resin compositions contain an efficient small core-shell impact modifier that allows for a novel combination of properties: a high impact resistance capstock resin with high melt flow rate and low water haze that allows for better processability and durability for use in high temperature and high humidity environments. Multilayer structures formed using the polymeric capstock composition over a thermoplastic substrate.

18 Claims, No Drawings

MULTILAYER STRUCTURE WITH A HIGH IMPACT RESISTANCE, HIGH MELT FLOW, LOW WATER HAZE CAP LAYER

CROSS-REFERENCE TO RELATED APPLICATION

This is the U.S. National Phase Application of PCT/US2021/051644, filed Sep. 23, 2021, which claims priority to U.S. Provisional Patent Application No. 63/083,281, filed on Sep. 25, 2020, titled "MULTILAYER STRUCTURE WITH CAPSTOCK RESIN THAT PROVIDE HIGH IMPACT RESISTANCE WITH HIGH MELT FLOW RATE AND LOW WATER HAZE AS CAP LAYER FOR OUTDOOR AND CONSUMER APPLICATIONS" the entirety of each of which is are incorporated by reference herein for all purposes.

FIELD OF THE INVENTION

The invention relates to polymeric resin compositions, and preferably acrylic or styrenic polymeric compositions, which are especially useful as a capstock material for coextrusion over, or lamination onto structural plastics. The polymeric capstock resin compositions contains an efficient small core-shell impact modifier that allows for a novel combination of properties: a high impact resistance capstock resin with high melt flow rate and low water haze that allows for better processability and durability for use in high temperature and high humidity environments. The invention also relates to multilayer structures formed using the inventive polymeric capstock over a thermoplastic substrate.

BACKGROUND OF THE INVENTION

Certain structural plastics, such as high impact polystyrene (HIPS), acrylonitrile/butadiene/styrene (ABS) resins, poly(vinyl chloride)(PVC) resins, and the like, exhibit attractive mechanical properties when extruded, molded, or formed into various articles of manufacture. Such articles include, for example, bathtubs, shower stalls, counters, appliance housings and liners, building materials, such as doors, windows and shutters, and storage facilities. Although these structural plastics are strong, tough and relatively inexpensive, the properties of their exposed surfaces are less than ideal. That is, the surfaces of the structural plastics are degraded by light; they can be easily scratched; they are eroded by common solvents, etc.

Consequently, it has become a practice in the industry to apply another resinous material over the structural plastic to protect the underlying structural material and provide a surface that can withstand abuse associated with the use environment. Such surfacing materials are called "capstocks".

The capstock generally is much thinner than the structural plastic, typically being about 10 to about 25% of the total thickness of the composite comprising the capstock and structural plastic plies. For example, the thickness of the capstock can be about 0.05 to about 1.25 mm, whereas the thickness of the structural plastic ply can be about 1.0 to about 10 mm.

As a class, acrylic resins, known for their excellent optical characteristics, resistance to degradation by sunlight, hardness, inertness to water and common chemicals, durability, and toughness, are capstocks of choice for various structural plastics, such as ABS sheet. The mechanical properties of the capstock generally are secondary to those of the structural plastic, but it is important that the capstock not adversely affect the mechanical properties of the composite.

In a multi-layer structures, where the substrates are structural plastics such as HIPS, PVC, and ABS, a high impact resistance capstock is preferred to minimize defects such as chips and cracking during fabrication and installation. Impact grade acrylics are commonly used as the capstock (protective layer) over ABS, PVC, and other resins to provide good appearance, gloss, surface hardness, and weather resistance to sheet and formed parts.

Compared to paint or other coatings, acrylic capstocks offers better weatherability, less maintenance, better scratch and mar performance. One of the technical challenges is the impact resistance as the substrate such as ABS, PVC, and HIPS all have superior impact resistance compared to the acrylic capstock. It is widely known that impact modifiers can be added to acrylic resins to improve the impact resistance; however, the addition of impact modifier often lead to lower melt flow rate (higher viscosity during processing temperatures) and water haze issues. Water haze is the haze imparted to a material when immersed or exposed to elevated humidity (generally made worse with hot water).

Problem: High impact resistance acrylic resins and other thermoplastic polymers useful in capstock composition can be difficult to process due to low melt flow rates or high viscosity at elevated processing temperatures. In addition, high impact acrylic resins exhibit pronounced water haze at elevated temperatures, thus compromising the surface appearance of articles at high humidity and high temperature environments.

Solution: Surprisingly, it has now been found that an polymeric capstock, which maintains the desirable acrylic features (surface aesthetics, scratch and mar resistance, and UV resistance), maintain good adhesion to HIPS, PVC, and ABS, and exhibits high impact resistance without compromising melt flow rate and water haze can be achieved using an efficient, small core-shell impact modifier. The efficient, small core-shell impact modifier (also described herein as a small high impact modifier or SHIM) capstocks of the invention provide for a novel combination of properties: a high impact resistance capstock resin with high melt flow rate and low water haze that allows for better processability and durability for use in high temperature and high humidity environments. While a preferred capstock composition has an acrylic matrix, the invention is applicable to other thermoplastic polymers, blend and alloys that are typically used for capstock compositions Multi-layer structures having the capstock of the invention are useful for transportation, building and construction, and consumer applications where high impact resistance, high melt flow rate, and low water haze is desired.

SUMMARY OF THE INVENTION

Non-limiting aspects of this disclosure may be summarized below:

Aspect 1: A polymeric capstock composition comprising:
a) 10-95% a thermoplastic matrix;
b) 5-60% small high impact modifiers; and
c) 0-40% additive acrylic polymer comprising:
   5-90% methyl methacrylate monomer units,
   10-95% C2-12 alkyl methacrylate monomer units, preferably C2-6, most preferably C4,
   0-15% methacrylic acid, acrylic acids or C1-5 esters thereof, and
   0-5% other ethylenically unsaturated monomer units.

Aspect 2: The polymeric capstock composition of Aspect 1, wherein said matrix polymer is selected from the group consisting of acrylics, styrenics, polyvinyl chloride (PVC), polylactic acid (PLA), polyvinylidene fluoride (PVDF), polyamides, copolyamides and polyether-bock-polyamide, acrylonitrile-styrene-acrylate/PVC blends, acrylonitrile-styrene-acrylate/acrylic blends, PLA/acrylic blends, PVDF/acrylic blends, and polyether/acrylic blends.

Aspect 3: The polymeric capstock composition of either Aspect 1 or Aspect 2, wherein said matrix polymer is an acrylic matrix comprising one or more alkyl (meth)acrylate homopolymer or copolymers.

Aspect 4: The polymeric capstock composition of any of Aspects 1-3, wherein said alkyl (meth)acrylate matrix is selected from a polymethyl methacrylate homopolymer and copolymers of methyl methacrylate with from 0.1-30 wt % C1-4 alkyl acrylates.

Aspect 5: The polymeric capstock composition of any of Aspects 1-4, wherein said small high impact modifiers comprise from a. 0.5 to 40 weight percent, preferably 1 to 20 weight percent, more preferably 2 to 15 weight percent, and most preferably 5 to 10 weight percent of a hard core polymeric stage with a Tg>0° C., b. 10 to 80 weight percent, preferably 55 to 80 weight percent of an inner polymeric shell with a Tg<0° C., c. 5-50 weight percent, preferably 10 to 20 weight percent of an outer polymeric shell with a Tg>0° C., wherein the ratio of emulsifier to surface area of said core-shell particle is less than 1.5×10-4 g/m2, based on the core-shell particles as synthesized and without further processing.

Aspect 6: The polymeric capstock composition of any of Aspects 1-5, wherein said small high impact modifier has a radius of <200 nm, more preferably <100 nm.

Aspect 7: The polymeric capstock composition of any of Aspect 1-6, wherein said additive acrylic polymer comprises from 5 to 40 wt percent, preferably 5 to 30 wt percent, and more preferably 10 to 25 weight percent, based on the total acrylic capstock composition.

Aspect 8: The polymeric capstock composition of any of Aspects 1-7, wherein said additive acrylic polymer has a molecular weight from 40,000-300,000, preferably 40,000-100,000 g/mol.

Aspect 9: The polymeric capstock composition of any of Aspects 1-8, wherein said additive acrylic polymer comprises 20-50% methyl methacrylate monomer units and 50-80% butyl methacrylate monomer units, and has a molecular weight from 40,000-300,000, preferably 40,000-100,000.

Aspect 10: The polymeric capstock composition of any of Aspects 1-9, wherein said additive acrylic polymer comprises 50-80% methyl methacrylate and 20-50% butyl methacrylate and said copolymer has a (Mw) molecular weight from 40,000-300,000, preferably 40,000-100,000.

Aspect 11: A multi-layer polymer structure comprising a capstock layer comprising the polymeric capstock composition of any of Aspects 1-10, adhered directly to a thermoplastic structural substrate.

Aspect 12: The multi-layer polymer structure of Aspect 11, wherein said thermoplastic structural substrate is selected from the group consisting of impact polystyrene (HIPS), acrylonitrile/butadiene/styrene (ABS), poly(vinyl chloride)(PVC), olefins, polycarbonate (PC), polyethylene terephthalate (PET), and polyurethane or polyester composites.

Aspect 13: The multilayer polymer structure of either Aspect 11 or Aspect 12, wherein said capstock layer is from 0.05 to 1.25 mm thick, and said thermoplastic structural substrate is from 1.0 to about 10 mm in thickness, and wherein said capstock layer is thinner than said substrate layer.

Aspect 14: The multilayer polymer structure of any of Aspects 11-13, wherein said substrate layer represents from 50 to 99 percent of the multilayer structure, and said capstock layer represents from 1 to 50 percent of said multilayer structure.

Aspect 15: An article comprising the multi-layer structure of any of Aspects 11-14.

Aspect 16: The article of Aspect 15, wherein said article is at least one of a recreational vehicle, sporting equipment, marine, aerospace, decking, railing, siding, window profile, door profiles, dishwasher, dryers, refrigerator, freezers, appliance housing, appliance door, bathtub, shower stall, counters top, storage structure, decorative exterior trim, molding side trim, quarter panel trim panels, fender and fender extensions, louvers, rear end panels, caps for pickup truck, rearview mirror housings, accessories for trucks, buses, campers, vans, and mass transit vehicles, b pillar extensions; appliances and tools, lawn and garden implements, bathroom fixtures, fencing, components of pleasure boats, exterior components of mobile homes, lawn furniture, chair and table frames, pipe and pipe end caps, luggage, shower stalls, toilet seats, signs, spas, air conditioner and heat pump components, kitchen housewares, bead molded picnic coolers, picnic trays and jugs, trash cans; venetian blind components; sporting goods, sailboards, sailboats; plumbing parts, lavatory parts; construction components, architectural moldings, door molding, louvers, and shutters, mobile home skirting, residential doors, commercial doors, siding accessories, window cladding, storm window frames, skylight frames, end caps for gutters, awnings, or car port roofs.

DETAILED DESCRIPTION OF THE INVENTION

The invention relates to an improved polymeric capstock composition having a combination of a high impact resistance, a high melt flow rate, and low water haze. These attributes allow for better processability and durability for use in high temperature and high humidity environments. The polymeric capstock is attached over a thermoplastic substrate forming a multi-layer structure.

All references cited herein are incorporated by reference. Unless otherwise stated, all molecular weights are weight average molecular weights as determined by Gel Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random or block, may be heterogeneous or homogeneous, and may be synthesized by a batch, semi-batch or continuous process.

(Meth)acrylate is used to connote both acrylates and methacrylates, as well as mixtures of these. Polymers may be straight chain, branched, star, comb, block, or any other structure.

Polymeric Capstock

The polymeric capstock of the invention contains special small high impact modifier particles in a polymeric matrix, with optional other additives. Useful polymeric matrices of the invention include, but are not limited to, acrylics, styrenics, polyvinyl chloride (PVC), polylactic acid (PLA), polyvinylidene fluoride (PVDF), polyamides, copolyamides and polyether-bock-polyamide (such as PEBAX® resins from Arkema), as well as blends of these. Preferred polymeric matrices for the invention include acrylics, styrenics, and bends with an acrylic or styrenic resin.

Preferred blend polymeric matrices include, but are not limited to, acrylonitrile-styrene-acrylate/PVC blends, acrylonitrile-styrene-acrylate/acrylic blends, PLA/acrylic blends, PVDF/acrylic blends, and polyether/acrylic blends.

Styrenic polymers, useful as a matrix polymer in the capstock composition, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA.

Acrylic Capstock Composition

The invention will be illustrated using acrylic polymers as the capstock matrix polymer, however, one of ordinary skill in the art will understand that the other above-listed thermoplastic polymers and polymer blends could also be used and processed in the same manner, and produce similar results in terms of melt-flow, impact resistance and low water haze of the capstock composition.

The acrylic capstock composition of the invention contains special small high impact modifier particles in an acrylic polymer matrix, with optional other additives.

Acrylic polymers, as used herein, are meant to include homopolymers, and copolymers having two or more different monomer units that are formed from alkyl methacrylate monomers, alkyl acrylate monomers, and mixtures thereof.

The alkyl group can be from 1-18 carbon atoms, preferably 1-4 carbon atoms. Preferred are polymethyl methacrylate and copolymers of methyl methacrylate with from about 0.1-30% alkyl acrylates, where the alkyl contains 1-4 carbon atoms.

The alkyl methacrylate monomer is preferably methyl methacrylate, which may make up from greater than 51 to 100 percent of the monomer mixture. 0 to less than 49 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture.

Preferably the acrylic resin used as the matrix material of the capstock comprises a polymer or copolymer of methyl methacrylate (MMA); typical copolymers include 70 to 99.5% MMA and 0.5 to 30%, preferably 1 to 20%, of (C1-C10) alkyl acrylates, such as methyl acrylate and ethyl acrylate (EA). A suitable commercially available poly (methyl methacrylate) type thermoplastic matrix material is Plexiglas® V-grade molding resins, such as Plexiglas® V-825, V-826, V-045, V052, VM, VS, and V-920 etc., available from Arkema Inc.

Small High Impact Modifier (SHIM)

The impact modified acrylic polymer matrix of the invention includes special small high impact modifiers. The small high impact modifiers of the invention are synthesized in such a way to have a unique concentric morphology and/or a combination of high rubber loading and low particle size and/or require only a low surfactant level. The incorporation of these small high impact modifiers into the cap layer acrylic matrix composition allows for a novel combination of properties: a combination of high impact while retaining high melt flow rate, or a combination of high impact while retaining low haze in the presence of water at elevated temperatures.

The small high impact modifier of the invention is a multi-stage, sequentially-produced polymer having a core-shell particle structure. The core-shell impact modifier comprises at least three layers (hard core/inner elastomeric shell layer/outer hard shell layer, known as a "hard core, core-shell particle") or any higher number of layers, such as a soft seed core surrounded by a hard core/an elastomeric intermediate shell layer/a second different elastomeric layer/and one or more high $T_g$ outer shell layers. Other similar structures of multiple layers are known in the art.

In one preferred embodiment, the presence of a hard core layer provides a desirable balance of good impact strength, high modulus, and excellent UV resistance, not achieved with a core/shell modifier that possesses a soft-core layer. Core layer is defined here as a polymeric layer that has at least two polymeric layers on its outside. It need not be the innermost layer of the particle. The hard core layer ($T_g>0°$ C., preferably $T_g>20°$ C.) is typically a single composition polymer, but can also include the combination of a small amount of a low $T_g$ seed on which the hard core layer is formed. For example, a small 5% rubber core seed that becomes dispersed into a hard inner layer would be included in the invention as a hard core layer, as long as the combination behaves as a hard core high $T_g$ layer. The hard core layer can be chosen from any monomer combination meeting the $T_g$ requirements. Preferably, the hard core layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably, the acrylate ester units are chosen from methyl acrylate, ethyl acrylate, n-butyl acrylate, 2-ethylhexyl acrylate and octyl acrylate. Styrenic units include styrene, and derivatives thereof such as, but not limited to, alpha-methyl styrene, and para methyl styrene. In one embodiment, the hard core layer is all-acrylic. In another embodiment the hard core layer is acrylic with <30% styrenic monomer units.

At least one intermediate inner shell layer or layers are elastomeric, having a $T_g$ of less than 0° C., and preferably less than −20° C. Preferred elastomers include polymers and copolymers of alkyl acrylates, dienes, styrenics, and mixtures thereof. Preferably the soft intermediate layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably, the acrylate ester units are chosen from methyl acrylate, ethyl acrylate, n-butyl acrylate, 2-ethylhexyl acrylate and octyl acrylate. Useful dienes include, but are not limited to isoprene and butadiene. Useful styrenics include, but are not limited to alpha-methyl styrene, and para-methyl styrene. In a preferred embodiment, acrylate ester units comprise >75% of the elastomeric inner shell layer or layers. Preferably, the total amount of elastomeric layer(s) in the impact modifier is from 30-90 weight percent, more preferably from 40-85 weight percent, and most preferably from 55-80 weight percent, based on the total weight of the impact modifier particle.

The outer hard shell layer can be made of one or more shell layers, having a $T_g>0°$ C., more preferably $T_g>20°$ C., preferably selected from the list above for the hard core. The outer shell layer may be the same or different composition from the hard core layer. A level of functionalization may be included in the shell, to aid in compatibility with the polymer matrix as described in U.S. Pat. No. 7,195,820B2. Hydrophilic monomers may also be included in the shell to improve shell coverage or improve anti-blocking properties. Example of useful hydrophilic monomers include but are not limited to hydroxy alkyl (meth)acrylates, (meth)acrylic acid, (meth)acrylic amides, (meth)acrylic amines, polymerizable surfactants and macromonomers containing hydrophilic moieties.

In one aspect of the invention the core-shell polymer is a three stage composition wherein the stages are present in ranges of 0.5 to 40 percent by weight, preferably 1 to 20 weight percent, more preferably 2-15 weight percent and even 5-10 weight percent, of the first stage hard core layer; 10 to 80 weight percent, preferably 55 to 80 weight percent, of the second elastomeric inner shell stage; and 5 to 50 percent, preferably 10 to 20, of the outer shell stage, all percentages based on the total weight of the three-stage polymer particle. The core-shell polymer particle will have a radius of <200 nm, more preferably <100 nm. The small particle size is advantageous to maintaining excellent aesthetic properties such as transparency or high gloss when the core-shell particle is added to the acrylic matrix composition.

In another aspect of the invention the core-shell polymer is synthesized in a manner to produce a concentric circular particle—one that resembles a perfect bullseye. This concentricity and circularity is found to be advantageous to maximize impact performance when utilized in a polymeric composition.

The core-shell polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In a preferred embodiment, the impact modifier is made by sequentially emulsion polymerization. As is known in the art, in this type of polymerization, emulsifying agents are commonly used to allow for both the stabilization/transport of the monomer feeds to the growing core-shell particle and for the stabilization of core-shell particle itself in the aqueous medium. Emulsifying agents are defined as any organic or inorganic molecule that has both a hydrophobic and hydrophilic component in its structure. Use may also be made of mixtures of such surface-active agents, if need be.

In a more preferred embodiment, the emulsion synthesis of this particle is performed in a way that the ratio of the weight of the emulsifying agent to surface area of the core-shell particle is less than $1.5\times10^{-4}$ g/m$^2$ and preferably less than $9\times10^{-5}$ g/m$^2$. This ratio is the ratio present in the emulsion or after a recovery process when no specific steps have been utilized to remove emulsifying agents. Steps to remove emulsifying agents include but are not limited to latex coagulation, dialysis of latex, or washing of already isolated particles; these methods can often improve the water haze performance, but introduce additional manufacturing steps and adds cost. Spray drying is a method known in the art to efficiently recover core-shell particles at low without extra costly steps to remove emulsifying agents. Having low emulsifying agent level in particles recovered by spray drying is advantageous for maintaining lower water haze when the core-shell particle is utilized in polymeric compositions.

In one aspect of the invention, where the impact modifier is made by sequential emulsion polymerization, the aqueous reaction mixture obtained on conclusion of the final emulsion polymerization stage, which is composed, of an aqueous emulsion of the polymer according to the invention, is then treated in order to recover the polymer—in many cases in powder form. Spray drying a particularly preferred technique. An effective, but more costly technique is coagulation, where the emulsion is subjected, according to the emulsifying agent used, to a coagulating treatment by bringing into contact with a saline solution ($CaCl_2$ or $AlCl_3$) or a solution acidified with concentrated sulfuric acid and then to separate, by filtration, the solid product resulting from the coagulating, the said solid product then being washed and dried to give a graft copolymer as a powder. It is also possible to recover the polymer contained in the emulsion by using drum drying, freeze-drying or other means known in the art. During any of these processes, additives such as talc, calcium carbonate or silica may be used to aid in processing the powder. Hard particles may be used in conjunction with the core-shell particles of the invention to further improve anti-blocking and processing properties.

The impact modifier particle of the invention may be intimately combined with polymeric, organic or inorganic dispersing aids, anti-caking and/or other process aids or other impact modifiers as is commonly practiced by industry during spray drying or coagulation recovery processes. This process forms an impact modifier composite particle—where the core-shell impact modifier particle is intimately combined with the polymer, organic or inorganic additive or process aid. The core-shell impact modifier composite particles may be produced and subsequently recovered into powder form by means known in the art, including but not limited to co-spray-drying as separate streams into a spray-dryer; blending of the core-shell particles and process aids as a dispersion, and spray-drying the mixture; co-coagulation; co-freeze-drying; applying a dispersion or solution of the process aids onto the core-shell powder, followed by drying; physical blending of the impact modifier and process aid powders—which increases homogeneity in the powder form and leads to a more homogeneous blend into the matrix in a melt-blending; and physical blending followed by a weak melt blending of the impact modifier and process aid powders allowing for softening and adhesion of the particles without a full melt.

The impact modifier particles are present in the acrylic capstock layer at a level of from 5 to 70 weight percent, preferably 10 to 65 weight percent, and more preferably from 20 to 55 weight percent, based on the overall composition.

Additives

The capstock must have excellent adhesion to the structural plastic substrate. However, using current acrylic resin capstocks, for example, high impact polystyrene (HIPS) films or sheet articles, adhesion is unsatisfactory for commercial applications. To achieve a desirable or improved level of adhesion between the two layers, a polymeric acrylic additive can be added to the acrylic capstock. This polymeric additive is optional for substrates like PVC or ABS; addition of this additive will not hurt the adhesion between acrylic and these substrates and may add better flow properties when added.

The acrylic copolymeric additive can be a random copolymer, block copolymer or have a tapered morphology. A random copolymer is preferred due to its availability.

The acrylic polymeric additive of the invention is added to the acrylic matrix at from 0 to 40 weight percent, preferably from 5 to 40, preferably 5 to 30, and more preferably 10 to 25 weight percent, based on the total impact-modified acrylic capstock composition. The acrylic polymeric additive has a molecular weight from 40,000-300,000, preferably 40,000-100,000 g/mol.

The polymeric additive is a copolymer composed of
5-90% methyl methacrylate monomer units,
10-95% $C_{2-12}$ alkyl methacrylate monomer units, preferably $C_{2-6}$, most preferably $C_4$,
0-15% methacrylic acid, acrylic acid or $C_{1-5}$ esters thereof,
0-5% other ethylenically unsaturated monomer units.

In one preferred embodiment, the polymeric additive is 20-50% MMA and 50-80% butyl methacrylate (BMA).

In another preferred embodiment, the additive acrylic polymer is a 50-80% methyl methacrylate and 20-50% butyl methacrylate (BMA) polymer having a (Mw) molecular weight from 40,000-300,000, preferably 40,000-100,000.

The addition of 5 to 40, preferably around 5 to 30, most preferably about 10 to 25 weight percent of a MMA/BMA copolymer has been found to give a noticeable and beneficial improvement in adhesion to co-extruded multilayer acrylic/HIPS film or sheet without adverse effects on the beneficial acrylic physical properties.

The acrylic capstock composition may also include other modifiers or additives that are well known in the art. For example, the composition may contain impact modifiers, external lubricants, UV stabilizers, thermal stabilizers, anti-oxidants, flame-retardants, pigments, dye colorants, heat distortion temperature improvers, antistatic agents, physical or chemical blowing agents, nucleating agents, matting agents, and processing aids or the like. If desired, flow aids, metal additives for electronic magnetic radiation shielding such as nickel coated graphite fibers, coupling agents, such as amino silanes, and the like, may also be added. Additionally, fillers such as wood fibers, carbon fibers, glass fibers, glass beads, and minerals such as calcium carbonate, talc, titanium dioxide, barium sulfate, and the like optionally may be included in the composition of the present invention.

The blend of the small high impact modifier of the invention with the acrylic matrix polymer can be accomplished by any known method, such as dispersing the small high impact modifier in a monomer mixture used to prepare the acrylic polymer matrix, or in a monomer-polymer syrup mixture which together would provide the desired thermoplastic acrylic polymer matrix. Alternatively, small high impact modifier can be placed in a casting mix in the form of an emulsion, suspension or dispersion in water or in an organic carrier; the water or organic carrier can then be removed before or after casting into the final acrylic thermoplastic polymer form. The small high impact modifier may also be blended with the acrylic thermoplastic polymer by extrusion compounding.

Substrate

The impact-modified acrylic cap layer is directly attached on the external side of a structural plastic substrate layer to form a multi-layer structure. Useful structural plastic substrates include, but are not limited to impact polystyrene (HIPS), acrylonitrile/butadiene/styrene (ABS) resins, poly (vinyl chloride)(PVC) resins, olefins, polycarbonate (PC), polyethylene terephthalate (PET), and polyurethane or poly-ester composites.

Multi-layer Structure

A capstock can be applied to a structural plastic in several different ways. For example, preformed sheets, profiles, or films of the structural plastic and the capstock can be laminated together, as by thermal fusion, by press lamination, or by lamination via an appropriate adhesive or via a mutually compatible polymer interlayer. Other methods of lamination, such as co-calendering or bi-extrusion or even solution or dispersion casting, can be used to laminate structural plastics and an acrylic capstock. Alternatively, in appropriate cases, the structural plastic and an acrylic capstock can be coextruded, particularly feedblock coextruded. This is often a preferred method when the laminate is an acrylic-capped ABS sheet. A sheet of the composite can then be thermoformed into an article such as a bathtub, a shower stall, a counter top, etc.

The multi-layer structure is generally from 0.1 mm up to 25.4 mm in thickness having acrylic capstock layers measuring from 0.0254 mm, to 1.27 mm. The ratio of the substrate to the capstock varies widely across applications; the capstock thickness can be 1% to 50% of the substrate thickness. The lower end of the ratio covers structural applications such as recreational vehicles, windows, siding, while the higher end covers film applications.

Properties

The capstock composition of the present invention would have melt flow rate higher than 7 g/10 mins while maintaining an impact resistance of higher than 1.0 in-lb./mil (GVHIT impact strength of the composite is tested as per ASTM-D4226-00). Melt flow rate is measured using ASTM D1238 using 3.8 kg load at 230° C.

In a preferred embodiment, the melt flow rate of the capstock composition ranges from 7 and 15 g/10 mins, and impact resistance between 1.0 and 1.5 ft-lbs/in.

The capstock in the present invention can also have much higher impact resistance than 1.0 ft-lbs/in while maintaining a melt flow rate of 7-12 g/10 mins.

The capstock in this invention exhibits excellent water haze resistance at an GVHIT impact of 1.2 in-lb./mil, as indicated by a delta of haze of less than 1 for a transparent sample, or by a delta E of less than 3 for a translucent, opaque, or colored sample. By "transparent" is meant a TLT greater than 90% and a haze of less than 2, as measured by ASTMD1003 on a sample 3 mm in thickness. By translucent is meant a TLT of less than 90% and a haze greater than 2 as measured by ASTM 1003 of sample 3 mm in thickness.

The water haze resistance is tested with sample being immersed in 70° C. deionized water for 24 hours and followed by conditioning at room temperature and 50% relative humidity for over 24 hours. Delta E measures the change in visual perception of two colors and is calculated by the formula:

$$\Delta E_{ab}^* = \sqrt{(L_2^* - L_1^*)^2 + (a_2^* - a_1^*)^2 + (b_2^* - b_1^*)^2}$$

where the CIELAB color space L, a, and b, are measured with X-Rite Color 17 spectrophotometer.

Uses

The acrylic capstock would replace the paints or coatings used on articles such as rigid PVC profiles for windows, HIPS panels for refrigerator interiors, ABS panels for recreational vehicles, and the like. The high impact acrylic capstock composition can also be used in other applications such as recreational vehicle, sporting equipment, marine, aerospace, decking, railing, siding, window and door profiles, dishwasher and dryers, refrigerator and freezers, appliance housing or doors, bathtubs, shower stalls, spas, counters, and storage facilities, decorative exterior trim, molding side trim, quarter panel trim panels, fender and fender extensions, louvers, rear end panels, caps for pickup truck back, rearview mirror housings, accessories for trucks, buses, campers, vans, and mass transit vehicles, b pillar extensions, and the like; appliances and tools such as lawn and garden implements, bathroom fixtures for mobile homes, fencing, components of pleasure boats, exterior components of mobile homes, lawn furniture such as chair and table frames, pipe and pipe end caps, luggage, shower stalls for mobile homes, toilet seats, signs, spas, air conditioner and heat pump components, kitchen housewares, bead molded picnic coolers, picnic trays and jugs, and trash cans; venetian blind components; sporting goods such as sailboards, sailboats; plumbing parts such as lavatory parts and the like; construction components, in addition to those mentioned previously, the additional components including architectural moldings, door molding, louvers, and shutters, mobile home skirting, residential or commercial doors, siding accessories, window cladding, storm window frames, skylight frames, end caps for gutters, awnings, car port roofs, etc.

EXAMPLES

General Synthesis of Core-Shell Impact Modifiers

The core/shell polymer of the invention is preferably synthesized by emulsion free-radical polymerization. A general procedure for producing a 4 stage core-shell polymer particle will be described. One skilled in the art will be able to modify this procedure to form other core-shell particles useful as impact modifiers.

In a first stage (hard core layer), an emulsion is prepared which contains, per part by weight of monomers to be polymerized, 1 to 10 parts of water, 0.001 to 0.03 parts of an emulsifying agent, a portion of (meth)acrylate monomer mixture and at least one polyfunctional crosslinking agent. The reaction mixture thus formed is stirred and maintained at a temperature ranging from 45° C. to 85° C. and preferably at a temperature in the region of 60-80° C. 0.0001 to 0.005 parts of a catalyst which generates free radicals is then added along with equal parts of an activator compound that increases radical flux and the reaction mixture thus formed is maintained at a temperature of, for example, between ambient temperature and 100° C., and with stirring for a period sufficient to obtain virtually complete conversion of the monomers. Further additions of alkyl acrylate monomer(s) and the grafting agent, as well as, at the same time, 0.0001 to 0.005 part of a catalyst which generates free radicals, are then added simultaneously to the phase thus obtained, until the target particle size is reached.

In a second stage, the said core is grafted with a choice of monomers that will form a polymer with a Tg<0° C. (inner shell). To do this, an appropriate amount of the said monomer mixture is added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature greater than the abovementioned range, with stirring, until virtually complete conversion of the grafting monomers is obtained. As described above, use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if need be. In one embodiment, the emulsion may be made in a semi-continuous process, preferably at reaction temperatures of from 60-90° C., and preferably from 75° C. to 85° C.

In a third stage, the said elastomer shell is grafted with a choice of monomers that will form a polymer with a Tg>0° C. (outer shell). To do this, an appropriate amount of the said monomer mixture is added to the reaction mixture resulting from the second stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the range for stage 2, with stirring, until virtually complete conversion of the grafting monomers is obtained. As described above, use may be made, as emulsifying agent, of any one of the known surface-active agents, whether anionic, nonionic or even cationic. In one embodiment, the emulsion may be made in a semi-continuous process, preferably at reaction temperatures of from 60-90° C., and preferably from 75° C. to 85° C.

In a fourth stage, the process from the third stage is repeated such that the shell thickness will be increased and the resulting latex can be isolated into a powder by spray drying.

In general, preferred catalysts capable of being employed in all stages are compounds which give rise to free radicals under the temperature conditions chosen for the polymerization. These compounds can in particular be peroxide compounds, such as hydrogen peroxide, alkali metal persulfates and in particular sodium or potassium persulfate, ammonium persulfate; percarbonates, peracetates, perborates, peroxides such as benzoyl peroxide or lauroyl peroxide, or hydroperoxides, such as cumene hydroperoxide, diisopropylbenzene hydroperoxide, para-menthane hydroperoxide, tert-amyl or tert-butyl hydroperoxide. However, it is preferable to use, in the core stage, catalytic systems of redox type formed by the combination of a non-ionic peroxide compound, for example t-butyl hydroperoxide as mentioned above, with a reducing agent, in particular such as alkali metal sulfite, alkali metal bisulfite, sodium formaldehyde sulfoxylate, ascorbic acid, glucose, and in particular those of the said catalytic systems which are water soluble, for example t-butyl hydroperoxide/Bruggolite FF7, or diisopropylbenzene hydroperoxide/sodium formaldehyde sulfoxylate. It is also possible to add, to the polymerization mixture of one and/or other of the stages, chain-limiting compounds, and in particular mercaptans such as dodecyl mercaptan, isobutyl mercaptan, octyl mercaptan, dimercapto dioxaoctane, or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

MMA=methyl methacrylate
EA=ethyl acrylate
ALMA=allyl methacrylate
BA=butyl methacrylate
Sty=styrene
KDDBS=potassium dodecylbenzene sulfonate

Example 1

Synthesis of Impact Modifier 1

This example illustrates the preparation of a multi-stage, sequentially-produced polymer of the given composition, using the method of the prior art, targeting a radius of 150 nm.

A monomer charge consisting of 34% of Stage 1 was emulsified in water using KDDBS as the emulsifier and using potassium carbonate to control the pH and was polymerized using potassium persulfate at elevated temperatures. The remaining portion of Stage 1 was then added to the preformed polymer emulsion and was polymerized using potassium persulfate at elevated temperatures controlling the amount of soap added to prevent the formation of a significant number of new particles. The Stage 2 monomers were then added and polymerized using potassium persulfate at elevated temperatures controlling the amount of soap added to prevent the formation of a significant number of new particles. The Stage 3 monomers were then polymerized using potassium persulfate at elevated temperatures and again controlling the amount of soap added to prevent the formation of a significant number of new particles. The polymer was isolated by coagulation, freeze-drying, or spray-drying.

The ratio of the three stages was 35//45//20
The composition of the three stages is
Stage 1: 95.8/0.4/0.2 MMA/EA/ALMA
Stage 2: 80/18/2.0 BA/Sty/ALMA
Stage 3: 96/4 MMA/EA
Synthesis of Impact Modifier 2

This example illustrates the preparation of a multi-stage, sequentially produced polymer of composition.

The ratio of the three stages was 2//83//15
The composition of the three stages was
Stage 1: 9/90/1 MMA/Sty/ALMA
Stage 2: 83/16/1 BA/Sty/ALMA
Stage 3: 100 MMA A monomer charge consisting of stage 1 was emulsified in deionized water using KDDBS (potassium n-dodecyl benzenesulfonate). The emulsion was heated between 50-70° C. and initiated with a 1:1 weight ratio of tert-butyl hydroperoxide to Bruggolite® FF7 sulfinic acid reducing agent (Brüggemann) to get a suitable rate of polymerization. The temperature was increased to at least 80° C. and, after nearly complete conversion, potassium carbonate was added to regulate pH for stage 2 and 3. The stage 2 mixture was fed gradually along with a controlled amount of KDDBS to limit the generation of new particles and to maintain latex stability. Potassium persulfate was added concurrently with the stage 2 mixture to control polymerization rate, residual salt content and pH level. Following the addition, the latex was allowed to cure until <1% residual monomer remained. The stage 3 monomer mixture was added gradually with a limited amount of surfactant to control the particle growth. After the addition, the latex was allowed to cure until <0.1% residual monomer remained. The polymer was isolated by coagulation, freeze-drying, or spray-drying.

Synthesis of Impact Modifier 3

This example illustrates the preparation of a multi-stage, sequentially produced polymer of composition.

The ratio of the three stages was 2//75//23
The composition of the three stages was
Stage 1: 9/90/1 MMA/Sty/ALMA
Stage 2: 83/16/1 BA/Sty/ALMA
Stage 3: 100 MMA A monomer charge consisting of stage 1 was emulsified in deionized water using KDDBS. The emulsion was heated between 50-70° C. and initiated with a 1:1 weight ratio of tert-butyl hydroperoxide to Bruggolite® FF7 reducing agent to get a suitable rate of polymerization. The temperature was increased to at least 80° C. and, after nearly complete conversion, potassium carbonate was added to regulate pH for stage 2 and 3. The stage 2 mixture was fed gradually along with a controlled amount of KDDBS to limit the generation of new particles and to maintain latex stability. Potassium persulfate was added concurrently with the stage 2 mixture to control polymerization rate, residual salt content and pH level. Following the addition, the latex was allowed to cure until <1% residual monomer remained. The stage 3 monomer mixture was added gradually with a limited amount of surfactant to control the particle growth. After the addition, the latex was allowed to cure until <0.1% residual monomer remained. The polymer was isolated by coagulation, freeze-drying, or spray-drying.

Example 2 Preparation of Acrylic Capstocks and their Properties

The following three capstock layer polymer blends were prepared, two comprising a small high impact modifier discussed in previous application, and the third one comprising a commercial acrylic impact modifier (Durastrength® D350 from Arkema). A commercial acrylic capstock is also listed for comparison.

The acrylic cap formulation is prepared by melt-blending the components in a twin-screw extruder operating at 300-425 rpm with the typical processing temperatures listed below:

| Zone 1 | Zone 2 | Zone 3 | Zone 4 | Zone 5 | Zone 6 | Zone 7 | Zone 8 | Zone 9 | Die |
|---|---|---|---|---|---|---|---|---|---|
| 100° C. | 132° C. | 151° C. | 220° C. | 220° C. | 220° C. | 222° C. | 220° C. | 1382° C. | 260° C. |

These acrylic compositions and their melt flow rates are shown in Table 1. The melt flow rate is measured according to ASTM D1238 at 230° C. and 3.8 kg.

TABLE 1

Acrylic Capstock Compositions and Melt Flow Rates

| Ingredient/ Properties | Acrylic Cap- stock 1 (Invention) | Acrylic Cap- stock 2 (Invention) | Acrylic Cap- stock 3 (Compar- ative Example) | Commercial Acrylic Capstock (Compar- ative) |
|---|---|---|---|---|
| Acrylic Polymer Blend | 56 | 56 | 56 | 38.31 |
| Additive Acrylic Polymer | 10 | 10 | 10 | 10 |
| Impact Modifier 1 | 0 | 0 | 0 | 46.4 |
| Durastrength ® D350 | 0 | 0 | 30 | 0 |
| Impact Modifier 2 | 0 | 30 | 0 | 0 |
| Impact Modifier 3 | 30 | 0 | 0 | 0 |
| Pigments | 4.00 | 4.00 | 4.00 | 4.00 |
| Melt Flow Rate (G/10 Minutes) | 7.4 | 12 | 7.6 | 2.6 |

It is clear from Table 1 that the acrylic capstock in this invention, using the small high impact modifiers (Impact Modifier 2 and Impact Modifier 3), achieve higher melt flow rates than the commercial acrylic capstock. This allows for the capstock to flow better at extrusion temperatures and provide better coverage of the substrate in different designs.

The acrylic capstocks made were co-extruded over a PVC substrate with a custom made 1"×4" die and two extruders: a substrate layer extruder and a capstock layer extruder. The cap layer thickness is 200-250 microns. The PVC thickness is 1160-1270 microns.

The PVC substrate extruder was a single screw extruder operating at 8 revolutions per minute (RPM) with barrel temperature profile of 168° C. (feed end) to 182° C. (die end).

The acrylic blend cap stock layer extruder was a single-screw extruder with barrel temperature profile of 187° C. (feed) to 210° C. (die end). The co-extrusion die temperature for the profile was set at 168° C. and 185° C.

The GVHIT impact strength of the composite is then tested as per ASTM-D4226-00 and listed in Table 2. Water haze resistance was tested by immersing co-extruded samples in de-ionized water at 70° C. for 18 hours; the ΔE was calculated from the difference in color of the capstock before and after the water immersion test.

TABLE 2

Properties of Acrylic Capstocks Co-Extruded with PVC Substrate

| Acrylic Capstock Used In Co-Extrusion | Acrylic Capstock 1 (Invention) | Acrylic Capstock 2 (Invention) | Acrylic Capstock 3 (Compar- ative Example) | Commercial Acrylic Capstock |
|---|---|---|---|---|
| GVHIT Impact (MFE/Mil) | 1.21 | 1.20 | 1.08 | 1.21 |
| ΔE From Water Haze (70° C., 18 Hrs) | 1.74 | 2.79 | 20.5 | 2.98 |

Table 2 clearly shows that with this invention (Acrylic Capstock 1 and Acrylic Capstock 2), higher melt flow resins can be obtained while maintaining the same impact resistance. Moreover, the water haze resistance is also improved (smaller ΔE) with the current invention compared to the commercial acrylic capstock. When using the commercial acrylic modifier Durastrength® D350 (Acrylic Capstock 3), though the impact resistance is similar, the water haze resistance is significantly worse due to difference in impact modifier composition and surfactant levels.

What is claimed is:

1. A polymeric capstock composition comprising:
   a) 10-95% a thermoplastic matrix;
   b) 5-60% high impact modifiers having a radius <200 nm; and
   c) 5-30% additive acrylic polymer comprising:
       5-90% methyl methacrylate monomer units,
       10-95% $C_{2-12}$ alkyl methacrylate monomer units,
       0-15% methacrylic acid, acrylic acids or $C_{1-5}$ esters thereof, and
       0-5% other ethylenically unsaturated monomer units.

2. The polymeric capstock composition of claim 1, wherein said matrix is selected from the group consisting of acrylics, styrenics, polyvinyl chloride (PVC), polylactic acid (PLA), polyvinylidene fluoride (PVDF), polyamides, copolyamides and polyether-bock-polyamide, acrylonitrile-styrene-acrylate/PVC blends, acrylonitrile-styrene-acrylate/acrylic blends, PLA/acrylic blends, PVDF/acrylic blends, and polyether/acrylic blends.

3. The polymeric capstock composition of claim 1, wherein said high impact modifiers comprise from
   a. 0.5 to 40 weight percent of a hard core polymeric stage with a $T_g > 0°$ C., b. 10 to 80 weight percent of an inner polymeric shell with a $T_g$<0° C., c. 5-50 weight percent of an outer polymeric shell with a $T_g$>0° C., wherein the ratio of emulsifier to surface area of said core-shell particle is less than $1.5 \times 10^{-4}$ g/m$^2$, based on the core-shell particles as synthesized and without further processing.

4. The polymeric capstock composition of claim 1, wherein said high impact modifier has a radius of <100 nm.

5. The polymeric capstock composition of claim 1, wherein said additive acrylic polymer comprises from 10 to 25 wt percent, based on the total polymeric capstock composition.

6. The polymeric capstock composition of claim 1, wherein said additive acrylic polymer has a molecular weight from 40,000-300,000 g/mol.

7. The polymeric capstock composition of claim 1, wherein said additive acrylic polymer comprises 20-50% methyl methacrylate monomer units and 50-80% butyl methacrylate monomer units, and has a molecular weight from 40,000-300,000.

8. The polymeric capstock composition of claim 1, wherein said additive acrylic polymer comprises 50-80% methyl methacrylate and 20-50% butyl methacrylate and said copolymer has a (Mw) molecular weight from 40,000-300,000.

9. A multi-layer polymer structure comprising a capstock layer comprising the polymeric capstock composition of claim 1, adhered directly to a thermoplastic structural substrate.

10. The polymeric capstock composition of claim 1, wherein said additive acrylic polymer comprises 20-50% methyl methacrylate monomer units and 50-80% $C_{2-12}$ alkyl methacrylate monomer units.

11. The polymeric capstock composition of claim 1, wherein said additive acrylic polymer comprises 0.2-15% of methacrylic acid, acrylic acids or $C_{1-5}$ esters thereof.

12. The polymeric capstock composition of claim 1, wherein said matrix is an acrylic polymer comprising one or more alkyl (meth)acrylate homopolymer or copolymers.

13. The polymeric capstock composition of claim 12, wherein said alkyl (meth)acrylate homopolymer or copolymers is selected from a polymethyl methacrylate homopolymer and copolymers of methyl methacrylate with from 0.1-30 wt % $C_{1-4}$ alkyl acrylates.

14. The multilayer polymer structure of claim 9, wherein said substrate layer represents from 50 to 99 percent of the multilayer structure, and said capstock layer represents from 1 to 50 percent of said multilayer structure.

15. The multi-layer polymer structure of claim 14, wherein said thermoplastic structural substrate is selected from the group consisting of impact polystyrene (HIPS), acrylonitrile/butadiene/styrene (ABS), poly(vinyl chloride) (PVC), olefins, polycarbonate (PC), polyethylene terephthalate (PET), and polyurethane or polyester composites.

16. The multilayer polymer structure of claim 14, wherein said capstock layer is from 0.05 to 1.25 mm thick, and said thermoplastic structural substrate is from 1.0 to about 10 mm in thickness, and wherein said capstock layer is thinner than said substrate layer.

17. An article comprising the multi-layer structure of claim 9.

18. The article of claim 17, wherein said article is at least one of a recreational vehicle, sporting equipment, marine, aerospace, decking, railing, siding, window profile, door profiles, dishwasher, dryers, refrigerator, freezers, appliance housing, appliance door, bathtub, shower stall, counters top, storage structure, decorative exterior trim, molding side trim, quarter panel trim panels, fender and fender extensions, louvers, rear end panels, caps for pickup truck, rearview mirror housings, accessories for trucks, buses, campers, vans, and mass transit vehicles, b pillar extensions; appliances and tools, lawn and garden implements, bathroom fixtures, fencing, components of pleasure boats, exterior components of mobile homes, lawn furniture, chair and table frames, pipe and pipe end caps, luggage, shower stalls, toilet seats, signs, spas, air conditioner and heat pump components, kitchen housewares, bead molded picnic coolers, picnic trays and jugs, trash cans; venetian blind components; sporting goods, sailboards, sailboats; plumbing parts, lavatory parts; construction components, architectural moldings, door molding, louvers, and shutters, mobile home skirting, residential doors, commercial doors, siding accessories, window cladding, storm window frames, skylight frames, end caps for gutters, awnings, and car port roofs.

*    *    *    *    *